US008026841B2

(12) United States Patent
Liu et al.

(10) Patent No.: US 8,026,841 B2
(45) Date of Patent: Sep. 27, 2011

(54) RANGE AND AZIMUTH RESOLUTION ENHANCEMENT FOR REAL-BEAM RADAR

(75) Inventors: Guoqing Liu, Cypress, CA (US); Ken Yang, Torrance, CA (US)

(73) Assignee: BAE SYSTEMS Controls Inc., Johnson City, NY (US)

( * ) Notice: Subject to any disclaimer, the term of this patent is extended or adjusted under 35 U.S.C. 154(b) by 0 days.

(21) Appl. No.: 12/233,173

(22) Filed: Sep. 18, 2008

(65) Prior Publication Data

US 2010/0066586 A1   Mar. 18, 2010

(51) Int. Cl.
*G01S 13/89* (2006.01)
*G01S 13/00* (2006.01)

(52) U.S. Cl. ........... 342/33; 342/89; 342/91; 342/93; 342/118; 342/128; 342/133; 342/146; 342/147; 342/175; 342/176; 342/179; 342/195; 342/196

(58) Field of Classification Search ........ 342/21, 342/22, 25 R–25 F, 27–51, 89, 91, 93, 118, 342/128–133, 146, 147, 175, 176, 179, 192–197; 701/1, 3, 16–18
See application file for complete search history.

(56) References Cited

U.S. PATENT DOCUMENTS

| | | | |
|---|---|---|---|
| 4,723,123 A * | 2/1988 | Marlow et al. | 342/33 |
| 5,218,360 A * | 6/1993 | Goetz et al. | 342/35 |
| 5,341,141 A * | 8/1994 | Frazier et al. | 342/59 |
| 5,446,461 A * | 8/1995 | Frazier | 342/22 |
| 5,654,890 A * | 8/1997 | Nicosia et al. | 701/16 |
| 5,673,050 A * | 9/1997 | Moussally et al. | 342/22 |
| 5,838,276 A * | 11/1998 | Chapman et al. | 342/35 |
| 6,181,271 B1 * | 1/2001 | Hosaka et al. | 342/33 |
| 6,219,594 B1 | 4/2001 | Nicosia et al. | |
| 6,311,108 B1 * | 10/2001 | Ammar et al. | 701/16 |
| 6,430,480 B1 * | 8/2002 | Ammar et al. | 701/16 |
| 6,469,655 B1 * | 10/2002 | Franke et al. | 342/36 |
| 6,563,451 B1 | 5/2003 | Krikorian et al. | |
| 6,591,171 B1 * | 7/2003 | Ammar et al. | 701/16 |
| 6,865,477 B2 | 3/2005 | Nicosia et al. | |
| 7,019,682 B1 | 3/2006 | Louberg et al. | |
| 7,212,152 B2 | 5/2007 | Nagasaku | |
| 2004/0178943 A1 | 9/2004 | Niv | |

OTHER PUBLICATIONS

Bui, L., et al., "Autonomous Landing Guidance System Validation", Proc. of SPIE, 1997, pp. 19-25, vol. 3088.
Hassanien, A. et al., "A Generalized Capon Estimator for Localization of Multiple Spread Sources", IEEE Transactions on Signal Processing, Jan. 2004, pp. 280-283, vol. 52, Issue 1.
Liu, G. et al., "Range and azimuth resolution enhancement for 94 GHz real-beam radar", Proc. of SPIE, Apr. 15, 2008, vol. 6947.

* cited by examiner

*Primary Examiner* — Bernarr Gregory
(74) *Attorney, Agent, or Firm* — Scully, Scott, Murphy & Presser, PC

(57) ABSTRACT

Disclosed is a method, means for and computer program for enhancing range and azimuth resolution in a two-dimensional (2D) image generated by a frequency modulated continuous-wave (FMCW) radar for providing enhanced situational awareness in autonomous approach and landing guidance (AALG) system by forming and displaying a two-dimensional (2D) model of landing conditions from received range and azimuth real beam radar (RBR) signals by rendering one or more target locations and amplitudes in both range and azimuth, selecting a region of interest from the displayed 2D model to enhance the one or more target locations in the selected region of interest, selectively applying range and azimuth resolution enhancement using a first and second beamforming approach or applying azimuth only resolution enhancement by using just the second beamforming approach to obtain an one or more accurate target location estimations and combining the enhanced one or more target locations to render an enhanced 2D image.

18 Claims, 4 Drawing Sheets

RANGE AND AZIMUTH RESOLUTION ENHANCEMENT FOR REAL-BEAM RADAR

BACKGROUND OF THE INVENTION

1. Field of the Invention

The present invention generally relates to radar systems and, more particularly, to a novel technique for enhancing two-dimensional (2D) resolution for real-beam radar (RBR) employed by autonomous approach and landing guidance (AALG) systems.

2. Description of the Prior Art

Currently, flight operations for commercial, military, and private pilots in adverse weather, at night or in low visibility conditions at airport facilities with minimal or no ground aids is either not permissible or hampered. Flight operations are not permissible due to lack of a ground-based instrument landing system (ILS). On the other hand, flight operations are hampered by conventional range and azimuth resolution generated by radar sensors and employed in existing autonomous approach and landing guidance (AALG) systems. AALG systems are a combination of raster imaging sensors, head-up displays, flight guidance and procedures embodied in a virtual reality heads up display (HUD) mounted in the aircraft cockpit which provide pilots with enhanced situational awareness in the above described zero ceiling/zero visibility conditions. Accordingly, AALG allows a pilot to maneuver an aircraft related to take off landing, rollout, taxiing and terminal parking in so-called global operations (e.g. all weather and obscured visibility conditions) providing a clear real-time view of the runway and ground.

Existing AALG systems employ millimeter wave radar that offers better range resolution than lower frequency microwave radars, which allows penetration of fog, smoke and other obscurants/obstructions far superior to for example infrared sensors. Millimeter wave (MMW) radars are classified in two broad categories of pulsed and continuous wave (CW) radar as well as more narrowly classified according to the specific variations or modes of operation associated with each type or use. One type of MMW radar is real-beam radar (RBR) (or real aperture radar (RAR)), which generates two-dimensional (2D) images in range and azimuth. However, conventional range and azimuth resolution generated by RBR and employed by AALG systems have several limitations as discussed below.

In conventional RBR, range resolution is achieved by transmitting a wideband radio frequency (RF) signal towards a target area. Then, as known to those skilled in the art, a linear frequency modulation (FM) technique widely used in frequency modulation continuous wave (FMCW) radar is employed. The linear FM technique is employed by FMCW radar where a stable frequency continuous wave radio energy signal is produced and modulated by a modulation signal. Modulation signals such, as triangular signals are predominately used for determining range and velocity. However sine, sawtooth and the like are also possibly used as modulation signals. After the modulation signal gradually varies the energy signal, it then mixes with a signal reflected from potential target(s) in the target area to produce a beat signal. Digital signal processing (DSP) is thereafter utilized for detection operations after the beat signals are passed through an Analog to Digital converter. However, the above-described conventional RBR range resolution techniques have drawbacks. For example, conventional range resolution is limited by the bandwidth of the swept frequency of the FMCW radar as well as the actual processed bandwidth.

On the other hand, conventional RBR achieves azimuth resolution by deploying a narrow beamwidth antenna, which is mechanically scanned within a controlled sector in the azimuth dimension. The advantage of this type-scanning antenna for radar imaging in azimuth is that it does not need complicated azimuth processing as required by synthetic aperture radar (SAR). However, the drawback of RBR is that its azimuth resolution is typically low and limited by the azimuth beamwidth, which is physically determined by the antenna aperture in the azimuth dimension. Hence, in order to improve azimuth resolution in the prior art one skilled in the art must make modifications in the radar front-end hardware to improve the image quality.

Conventional RBR also have several other drawbacks such as lacking clutter suppression and poor temporal processing. In conventional RBR, a windowed Fourier transform (FT) is utilized for range profile generator, which in turn renders a RBR image. Although the windowed FT purports to be a clutter suppression technique it actually lacks clutter suppression ability and thus gives low image quality. Conventional temporal processing also fails to improve the RBR image resolution. Temporal processing averages multiple image frames to reduce some clutter at a level determined by the number of image frames.

Hence, there is a need for a signal processing technique which can enhance both range and azimuth resolution for RBR employed by AALG systems without requiring modification of the radar front-end hardware to improve the image quality. That is it is highly desirable to enhance conventional range and azimuth resolution of RBR while suppressing clutter background so that both visual and automatic feature extraction (e.g., runway edge, road, shadow, etc) and target detection (e.g., vehicle, building, etc) capabilities can be improved for situational awareness (SA) applications such as AALG systems.

BRIEF SUMMARY OF THE INVENTION

The present invention describes a method of enhancing range and azimuth resolution in a two-dimensional (2D) image generated by a frequency modulated continuous-wave (FMCW) radar for providing enhanced situational awareness in autonomous approach and landing guidance (AALG) system.

Specifically, the present invention provides a method of enhancing range and azimuth resolution in a two-dimensional (2D) image generated by a frequency modulated continuous-wave (FMCW) radar for providing enhanced situational awareness in an autonomous approach and landing guidance (AALG) system, comprising the steps of, forming and displaying a two-dimensional (2D) model of landing conditions from received range and azimuth real beam radar (RBR) signals by rendering one or more target locations and amplitudes in both range and azimuth, selecting a region of interest from the displayed 2D model to enhance the one or more target locations and amplitudes in the selected region of interest, applying both range and azimuth resolution enhancement to enhance the rendered one or more target locations and amplitudes in both range and azimuth, and combining the enhanced one or more target locations and amplitudes to render an enhanced 2D image.

In another embodiment, the present invention provides a method of enhancing resolution in a two-dimensional (2D) image generated by a frequency modulated continuous-wave (FMCW) radar for providing enhanced situational awareness in autonomous approach and landing guidance (AALG) system, comprising the steps of, forming and displaying a two-dimensional (2D) model of landing conditions from received range and azimuth real beam radar (RBR) signals by rendering one or more target locations and amplitudes in both range and azimuth, selecting a region of interest from said displayed 2D model to enhance said one or more target locations and amplitudes in said selected region of interest, applying azimuth resolution enhancement to enhanced the rendered one or more target locations and amplitudes in azimuth; and combining the one or more target locations and amplitudes in range and azimuth to render an enhanced 2D image, wherein said azimuth resolution enhancement is enhanced by generating one or more second accurate target location estimations in azimuth by applying a second beamforming approach to said target locations in azimuth.

In yet another embodiment, the range resolution enhancement is enhanced by generating one or more first accurate target location estimations of the rendered one or more target locations in range by applying a first beamforming approach and the azimuth resolution enhancement is enhanced by generating one or more second accurate target location estimations in azimuth by applying a second beamforming approach.

In one embodiment of the present invention, the first beamforming approach adaptively applies a standard Capon beamforming approach comprising the steps of reproducing the original range and azimuth RBR signals in said selected region of interest, and beamforming said original range RBR signal to render one or more first accurate target locations in range by passing a frequency f of interest undistorted while attenuating all other frequencies.

In yet another embodiment of the present invention, the second beamforming approach adaptively applies a generalized Capon beamforming approach on the original azimuth RBR signal to render one or more second accurate target locations in azimuth by estimating a plurality of central angles and angular spreads of one or more hypothetical sources, the central angles and angular spreads derived from a azimuth sampling of a plurality of antenna beam pattern scans output from the real beam radar to determine which among the one or more hypothetical sources is of interest while rejecting all other hypothetical sources.

In another embodiment of the present invention, the one or more accurate target amplitude estimations of the rendered one or more target amplitudes in range and azimuth, according to the first option and second option are generated by linear least square approach with respect to the generated one or more first and second accurate target estimations in range and azimuth, respectively.

In yet another embodiment of the present invention, the azimuth sampling of a plurality of antenna beam pattern scans output from the real beam radar can be obtained by a linear stepped scan, a non-linear stepped scan or a sinusoidal scan, the linear and non-linear stepped scans are configured so that an azimuth sampling is taken at the same angle locations in each scan and the sinusoidal scan configured so that azimuth samples are taken at even and odd azimuth angle positions for different scans.

In a further embodiment of the invention, the generalized Capon beamforming approach further includes the steps of, estimating a data covariance matrix by employing a spatial average and temporal average on the received azimuth samples, a target location in range data, and inputted user parameters, calculating a signal covariance matrix from the plurality of antenna beam pattern scans output and the inputted user parameters, generating an inverse matrix from the estimated data covariance matrix, and estimating by adaptively applying a generalized Capon beamformer on combined the generated inverse matrix and the calculated signal covariance matrix, and outputting a azimuth resolved data matrix, wherein, if the azimuth sampling is obtained by sinusoidal scan the azimuth sampling is preprocessed by an interpolation approach to obtain a plurality of azimuth sample values at the same set of azimuth angle location as the first scan.

In another aspect of the invention, in the case that option one is selected, the target location in range data is the generated one or more accurate target location estimations in range, and in the case that option two is selected, the target location in range data is the rendered target locations in range.

In one embodiment of the invention, the step of selecting a region of interest further includes the step of selecting by an automatic and a manual selection approach.

In another embodiment of the present invention, wherein the automatic selection approach employs a constant false alarm rate (CFAR) detection-processing algorithm.

In another aspect of the present invention, the manual selection approach permits a user to select the region of interest of the potential target from an image display.

In one embodiment of the present invention, the standard Capon beamforming (CB) approach solves the following optimization problem, $$\min_{h} h^H \hat{R} h, \text{ subject to } h^H a(f) = 1,$$

where $$a(f) = [\, 1 \quad \ldots \quad e^{j2\pi f(K-1)}\,]^T, f \in [0, 1)$$

is a steering vector, wherein the CB approach comprises the steps of: determining a spectral weight vector $$\hat{h}_{CB}(f) = \frac{R^{-1}a(f)}{a^H(f)R^{-1}a(f)};$$

and calculating the output of the CB approach by substituting the determined spectral weight vector into the FIR output power to estimate of the filter output power at frequency f $$\hat{P}(f) = \frac{1}{a^H(f)R^{-1}a(f)},$$

wherein the CB approach passes the frequency f of interest undistorted while attenuating all other frequencies.

In another embodiment of the present invention, the step of estimating a data covariance matrix further includes, defining a data sample covariance matrix, $$\hat{R}_1 = \frac{1}{LM} \sum_{m=0}^{M-1} \sum_{l=0}^{L-1} x_m(l) x_m^H(l)$$

where $x_m(n) = a_m(\theta_n - \theta_s)\alpha_s + e_k(n)$, $n=0, \ldots, N-1$, $m=0, \ldots, M-1$ such that $\theta_s$ and $\theta_n$ denote an azimuth angel location of a target scatterer s and an azimuth angle where an azimuth sample is taken, respectively, $a_m(\theta_n - \theta_s)$ represents a target response at azimuth sample angle $\theta_s$ from the scatterer s, $x_k(n)$ corresponding to a data sample value obtained from the n-th azimuth angle position within an m-th azimuth scan and where N and M are a total number of azimuth samples within a section of interest and total number of scans, respectively, and $\alpha_s$ is an amplitude of the target scatterer s and a sub-vector of length M, $$x_m(l)=[x_m(l)\ldots x_m(l+K-1)]^T, l=0,\ldots,L-1;L=N-K+1$$

In another embodiment of the present invention, the step of calculating the signal covariance matrix farther including the sub-steps of, defining for an m-th scan $$\hat{R}_{sm} = \frac{1}{L}\sum_{l=0}^{L-1} a_m(l)a_m^H(l),$$

where $a_m(l)$ is a vector formed from the sequence $a_m(\theta_n-\theta_s)$ in the same way as $x_m(l)$ is formed from $x_m(n)$.

In yet another embodiment of the present invention, adaptively applying a generalized Capon Beamformer approach includes, maximizing a signal-to-noise ratio $$(SNR)_{max} \underset{h}{} \frac{h_i^H \hat{R}_{sm} h_i}{h_1^H \hat{R}_n h_1}$$

where $\hat{R}_n$ denotes a noise covariance matrix, $\hat{h}_i = p_{max}(\hat{R}_1^{-1}R_{sm})$, and $p_{max}(\,)$ denotes a principal eigenvector corresponding to a largest eigenvalue of a matrix, calculating a power received from the target scatterer by estimation $$P_1 = \frac{1}{LM}\sum_{m=0}^{M-1}\sum_{l=0}^{L-1}\left|\hat{h}_1^H x_m(l)\right|^2 = \hat{h}_1^H \hat{R}_1 \hat{h}_1.$$

In another aspect of the present invention, tie input user parameters are a filter length, azimuth subsection size and scan number.

The invention may farther include a means for providing an autonomous landing guidance (AALG) radar system in which situational awareness is enhanced by enhanced range and azimuth resolution in a two-dimensional (2D) image generated by a frequency modulated continuous-wave (FMCW) radar system comprising means for forming and displaying a two-dimensional (2D) model of landing conditions from received range and azimuth real beam radar (RBR) signals by rendering one or more target locations and amplitudes in both range and azimuth, means for selecting a region of interest from the displayed 2D model to enhance the one or more target locations and amplitudes in the selected region of interest, means for selectively applying both range and azimuth resolution enhancement as a first option to enhance the rendered one or more target locations and amplitudes in both range and azimuth or applying azimuth resolution enhancement only as a second option to enhance the rendered one or more target locations and amplitudes in azimuth only and means for combining the enhanced one or more target locations and amplitudes to render an enhanced 2D image, wherein the first option applies the range resolution enhancement by generating one or more accurate target location estimations of the rendered one or more target locations in range by applying a first beamforming approach and applies the azimuth resolution enhancement by generating one or more accurate target location estimations in azimuth by applying a second beamforming approach, and the second option accepts the rendered one or more target locations in range and applies the azimuth resolution enhancement by generating one or more accurate target location estimation in azimuth by applying the second beamforming approach.

A corresponding method, program storage device, and computer program product may also be provided.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE INVENTION

The present invention provides two-dimensional (2D) (range and azimuth) resolution enhancement for millimeter wave (MMW) real-beam radar (RBR) with linear or non-linear antenna scan in the azimuth dimension generated by a frequency modulated continuous-wave (FMCW) radar. By enhancing both range and azimuth resolution in a two-dimensional (2D) image, situational awareness in an autonomous approach and landing guidance (AALG) system is enhanced. Enhancement is achieved by forming a two-dimensional (2D) model of landing conditions from received range and azimuth real beam radar (RBR) signals. More specifically, the present invention describes a new architecture of super resolution processing, in which a dual-mode approach is used for defining region of interest for 2D resolution enhancement and a combined approach is deployed for obtaining accurate target location by employing a first beamforming approach in range and a second beamforming approach in azimuth while employing the conventional linear least square approach to obtain amplitude estimations of targets in both range and azimuth within the region of interest.

Figure 1:
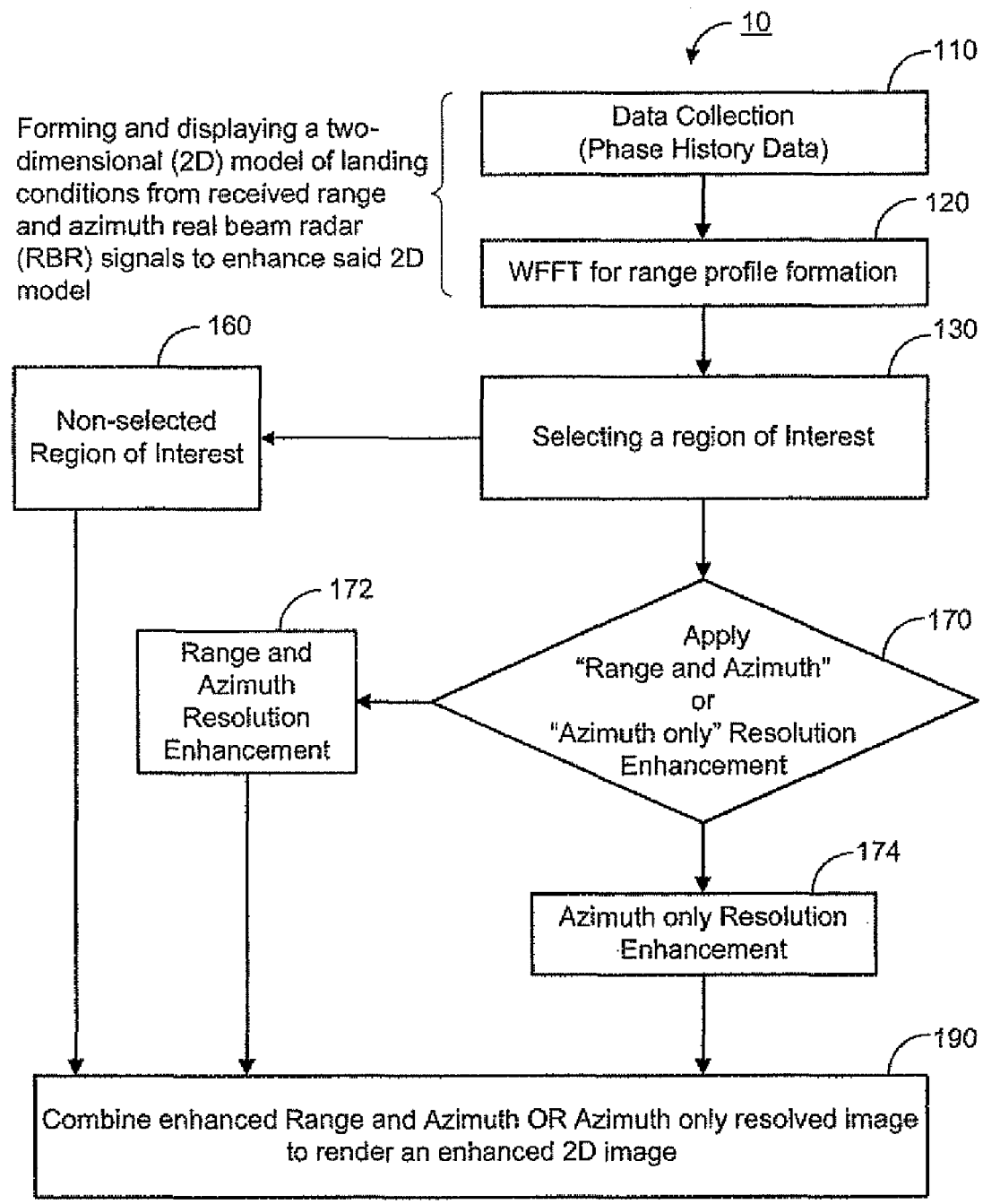
FIG. 1 depicts a signal processing flow diagram of the method enhanced two-dimensional (2D) range and azimuth resolution architecture, according to one embodiment of the present invention.

FIG. 1 depicts a signal processing flow diagram of an enhanced two-dimensional (2D) range and azimuth resolution method 10, according to one embodiment of the present invention. As can be seen in FIG. 1, after receiving range and azimuth real beam radar (RBR) signals 110, a region of interest 130 is selected. For example, a display (not shown) provided in a fixed-wing aircraft might allow a pilot might to select a portion of an imaging displaying a terrain (e.g. the left-side of a runway approach) to be enhanced by the present invention. After a region of interest is selected a determination is made whether to apply "range and azimuth" or azimuth only resolution enhancement 170. In this case, the pilot is examining a display screen showing an image of the selected region of interest (not shown) where the pilot will determine from the display screen whether to enhance the range and azimuth 172 of one or more potential target locations and amplitudes or to accept the rendered selected region of interest image in range. In the case where the pilot select to accept the rendered selected region of interest image in range, azimuth only resolution enhancement 174 is applied. Finally, the present invention combines the range and azimuth resolution enhanced image or azimuth only resolution enhanced image with the non-selected regions of interest images 160 to render an enhanced 2D image 190.

To achieve 2D resolution enhancement of a target location, a Capon beamformer (CB) approach (also known as the minimum variance method (MVM)) is employed to enhance range resolution. A generalized CB (GCB) approach is then applied to azimuth dimension for azimuth resolution enhancement of the target location. The GCB approach does not rely on whether the azimuth sampling is even or not and thus can be used in both linear and non-linear antenna scanning modes. One possible embodiment of the present invention is described below employing a 94 GHz real-beam frequency modulation continuous wave (FMCW) radar to improve the overall image quality compared to a conventional real-beam radar image. The benefits of the present invention can be realized by employing other real beam radar system such as 35 GHz FMCW as known to those skilled in the art.

Figure 2:
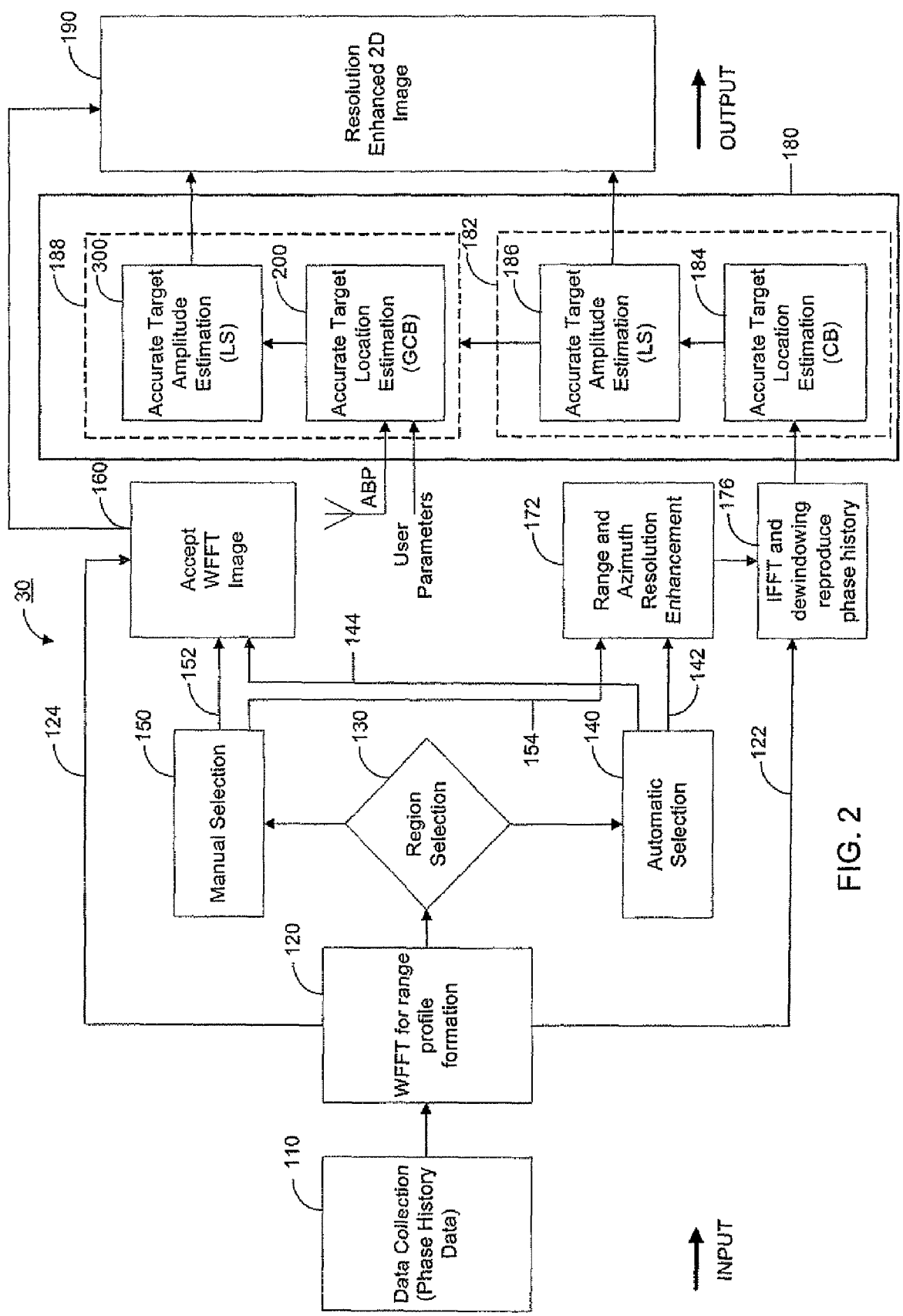
FIG. 2 depicts a block diagram of the enhanced two-dimensional (2D) range and azimuth resolution architecture employing both range and azimuth resolution enhancement, according to one embodiment of the present invention.

Referring now to FIG. 2 a block diagram of an enhanced two-dimensional (2D) range and azimuth resolution architecture 20, according to one embodiment of the present invention is shown. As shown in FIG. 2, a millimeter wave (MMW), real-beam radar (RBR) generates a beat signal and the phase history is extracted and stored in memory 110. A windowed fast Fourier transform (WFFT) is applied to the stored phase history data to form a range profile 120. Region selection 130 is provided for defining a region of interest for 2D resolution enhancement. As mentioned above, a pilot may select the region of interest to investigate possible ground obstructions or to generally provide for a more situational awareness. For example, the display may be a heads-up display (HUD), computer screen, LCD screen or the like employing a pointing function (e.g. mouse) as known to those skilled in the art. Moreover, the ability to select a region of interest avoids processing the whole image and allows for a choice that is to only process the region of interest for resolution enhancement. Moreover, one embodiment of the present invention provides for both automatic selection 140 and manual selection 150 of region selection 130 to implement the dual mode concept.

In one possible embodiment of the present invention automatic selection 140 can employ any adaptive algorithm as known to those skilled in the art to detect target returns against a background of noise, clutter and interference. For example, as known to those skilled in the art, the constant false alarm rate (CFAR) algorithm can be employed to select a region of interest with potential targets. A CFAR algorithm can extract various fixed stationary ground objects/terrain information such as a runway's edge, a road or taxiway, shadows and target detection (stationary vehicles and building and the like).

For manual region selection 150, a user may select the region of interest from an image displayed on a cockpit monitor or HUD (not shown) according to the user's visual judgment. The automatic selection 140 outputs automatically, a potential target 142 according to the detection algorithm, and clutter 144. On the other hand, manual selection 150, outputs a selected potential target 154 and clutter and non-selected targets (other) 152 are ignored. The clutter and non-selected targets can be detected by clutter detection algorithms, which are executed in conjunction with the manual selection by a user as known to those skilled in the art to provide enhancement. As shown in FIG. 2, arrows 122 and 124 illustrate the comparison between the originally transformed 2D image formed by the above described range profile 120 and the manual/automatic image to delineate between the potential target 142, clutter 144, selected potential target 154 and clutter and non-selected targets (other) 152. Non-selected targets (other) 152, clutter 144 and the original image range profile formation are all collected and stored in image storage 160. Later after range and azimuth enhancement, the non-selected images stored in image storage 160 are recalled from memory for rendering a resolved enhanced 2D image 190. The image storage 160 and the rendering of a resolved enhanced 2D image 190 are well known in the art including various digital image processing techniques.

Referring now back to FIG. 1, after a region of interest is selected a determination is made whether to apply "range and azimuth" or azimuth only resolution enhancement 170. In this case, the pilot is examining a cockpit display screen or HUD showing an image of the selected region of interest (not shown). At this point the pilot has the option to select 170 (apply "range and azimuth" or azimuth only resolution enhancement) range and azimuth resolution enhancement 172 or azimuth only resolution enhancement 174. In this case, the pilot will determine from the cockpit display screen or HUD whether to enhance the range and azimuth resolution 172 of one or more potential target locations and amplitudes or to enhance the rendered selected region of interest image in azimuth only resolution 174.

As can be seen in FIG. 2, prior to enhancing the range and azimuth of one or more potential target 142 and/or selected potential target 154, the phase history 176 (e.g. remaining original range and azimuth RBR signals) must be reproduced by apply an inverse windowed fast Fourier transform (IFFT).

Figure 3:
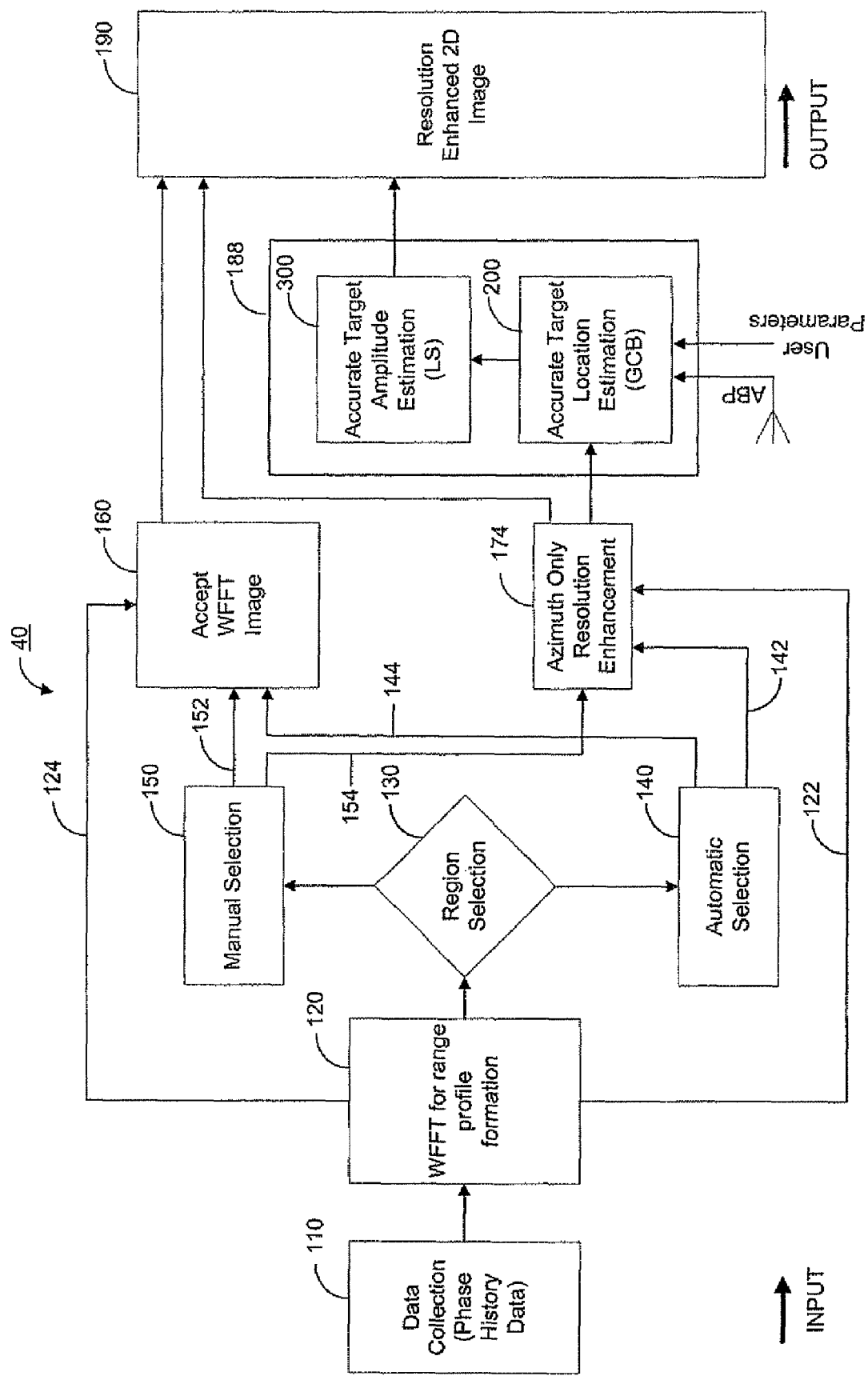
FIG. 3 depicts a block diagram of the enhanced two-dimensional (2D) range and azimuth resolution architecture employing azimuth only resolution enhancement, according to one embodiment of the present invention.

FIG. 2, for the selected region of interest 130, the potential target 142 and selected potential target 154 are subjected to 2D resolution enhancement in range and azimuth by a combined approach 180 to generate accurate estimations of both target scatter location and amplitude, first in range enhancement 182, then followed by azimuth enhancement 188. Range resolution enhancement 182 is shown in FIG. 2, and azimuth resolution enhancement 188 is shown in FIGS. 2 and 3, with more details of the generalized Capon beamformer approach provided in FIG. 4. The core of the resolution enhancement for both range and azimuth is based on the Capon Beamforming (CB) approach (also known as the minimum variance method (MVM)), which can be described as a spatial filter that passes the signal of a hypothetical point source arriving from the direction $\theta$ while maximally rejecting the signals coming from other directions. The above-mentioned combined approach 180 is deployed first in range for obtaining accurate target location estimations in range 184 and accurate target amplitude estimations in range 186 within the selected region of interest to achieve 2D resolution enhancement. As more fully described below, the standard Capon Beamformer (SCB) approach is employed for range enhancement 182 to obtain an accurate target amplitude estimation 184 from the reproduced original range and azimuth real beam radar (RBR) signal 176 (phase history) as shown in FIG. 2 for passing a frequency f of interest undistorted while attenuating all other frequencies.

After an accurate target location estimation in range 184 of one or more potential targets 142 and selected potential target 154 is generated, an accurate target amplitude estimation in range 186 is obtained by conventional linear least square (LLS) approach. Those skilled in the art appreciate that LLS approach extracts predictions from measurements and reduces the effect of measurement error. The enhanced accurate target location and amplitude estimations in range of the one or more potential targets 142 and selected potential targets 154 is output to allow for rendering a resolved enhanced 2D image 190 and available for correlating with azimuth sampling information and other inputs by generalized CB (GCB) approach which determines the accurate target location estimation in azimuth 200, as discussed in more detail below. After accurate target location estimation in azimuth 200 of one or more potential targets 142 and selected potential target 154 is generated, an accurate target amplitude estimation in range 300 is obtained by conventional linear least square (LLS) approach. The enhanced accurate target location 200 and amplitude estimations in azimuth 300 of the one or more potential targets 142 and selected potential targets 154 is output to allow for rendering a resolved enhanced 2D image 190.

Range Resolution Enhancement

A more detailed description of the actual filter design implementing the standard Capon beamforming (CP) approach to generate an accurate target location estimation in range 184 of one or more potential targets 142 and selected potential target 154 is now provided. As mentioned above, in FMCW radar, the beat signal (after down conversion) of the radar returns from targets is a summation of sinusoidal signals from all target scatters. Therefore, it is possible to enhance the range resolution by means of high-resolution spectral estimation that separates the sinusoidal signals in spectral domain. For simplicity of presentation, a sinusoidal data model is provided. The sinusoidal model has been widely used in the radar target feature extraction and radar imaging because it reflects, at least in theory, the trihedral-like point target scattering. The data model for the radar returns from these point targets (after frequency down conversion and de-chirping and before taking FFT) can be expressed as $$x(n) = \sum_{m=1}^{M} a_m e^{j2\pi f_m n} + e(n),$$
$$n = 0, \ldots, N-1$$
(Equation No. 1)

where N is the total number of samples during one frequency sweeping interval for an FMCW radar, M is the total number of point targets, $a_m$ and $f_m$ are the amplitude and frequency of the m-th point target, and e(n) is the noise term due to the n-th temporal sample. It should be noted that the phase for each scatterer has been included in the corresponding amplitude parameter and the amplitude estimation is thus taken under a complex-valued fashion. Moreover, this description shall consider normalized frequency quantity for each $f_m$ (with the sampling frequency as the normalizing factor by default). Therefore, each $f_m$ will take a value from 0 through 1 with the value 1 excluded.

The non-parametric model concerns the target response at frequency f of interest, which expresses the data sequence x(n) in a non-parametric but frequency dependent fashion $$x(n) = \alpha(f) e^{j2\pi f n} + e_f(n), n=0, \ldots, N-1, f \in [0,1)$$
(Equation No. 2)

where $\alpha(f)$ is the complex amplitude of a sinusoid with frequency f, and $e_f(n)$ the noise term at the frequency f.

To estimate the spectrum of the data sequence $\{x(n)\}_{n=0}^{N-1}$, or its frequency response at frequency point f, we design a finite impulse response (FIR) filter. Let h be a vector of length K denoting the FIR filter (K is now the order of the FIR filter). Define the data vector x(l) consisting of a sub-sequence of $\{x(n)\}$, $$x(l) = [x(l) \ldots x(l+K-1)]^T, l=0, \ldots, L-1$$
(Equation No. 3)

where the subscript T denotes the transpose, and L=N−K+1 is the total number of the sub-sequences. The CB approach estimates the spectrum of the data sequence by passing the data vector x(l) through the FIR filter h. The filter output due to the data sub-sequence (consisting of data samples x(l) through x(l+K−1)) can be expressed as $$y(l) = h^H x(l), l=0, \ldots, L-1$$
(Equation No. 4)

Then the power of the filter output can be written as $$P = \frac{1}{L}\sum_{l=0}^{L-1} |y(l)|^2 = h^H \hat{R} h$$
(Equation No. 5)

where the subscript H denote the conjugate transpose, and $$\hat{R} = \frac{1}{L}\sum_{l=0}^{L-1} x(l) x^H(l)$$
(Equation No. 6)

is referred to as the data sample covariance matrix.

As indicated above the CB approach requires that the signal with frequency f is not distorted while the responses at all other frequencies are attenuated as much as possible. Thus, CB intends to solve the following optimization problem:

$$\min_{h} h^H \hat{R} h, \text{ subject to } h^H a(f) = 1$$
(Equation No. 7)

where $$a(f) = [1 \ \ldots \ e^{j2\pi f(K-1)}]^T, f \in [0,1).$$
(Equation No. 8)

is the target response or steering vector. The solution to the optimization problem in (7) is given by $$\hat{h}_{CB}(f) = \frac{R^{-1} a(f)}{a^H(f) R^{-1} a(f)}.$$
(Equation No. 9)

Once the FIR filter h is obtained for the frequency f of interest, the output of the CB filtering can be readily calculated. Substituting Equation No. 9 into Equation No. 5 gives the estimate of the filter output power at frequency f, $$\hat{P}(f) = \frac{1}{a^H(f) R^{-1} a(f)}$$
(Equation No. 10)

which is the accurate target location estimation 184 in FIG. 2.

Azimuth Resolution Enhancement

Figure 4:
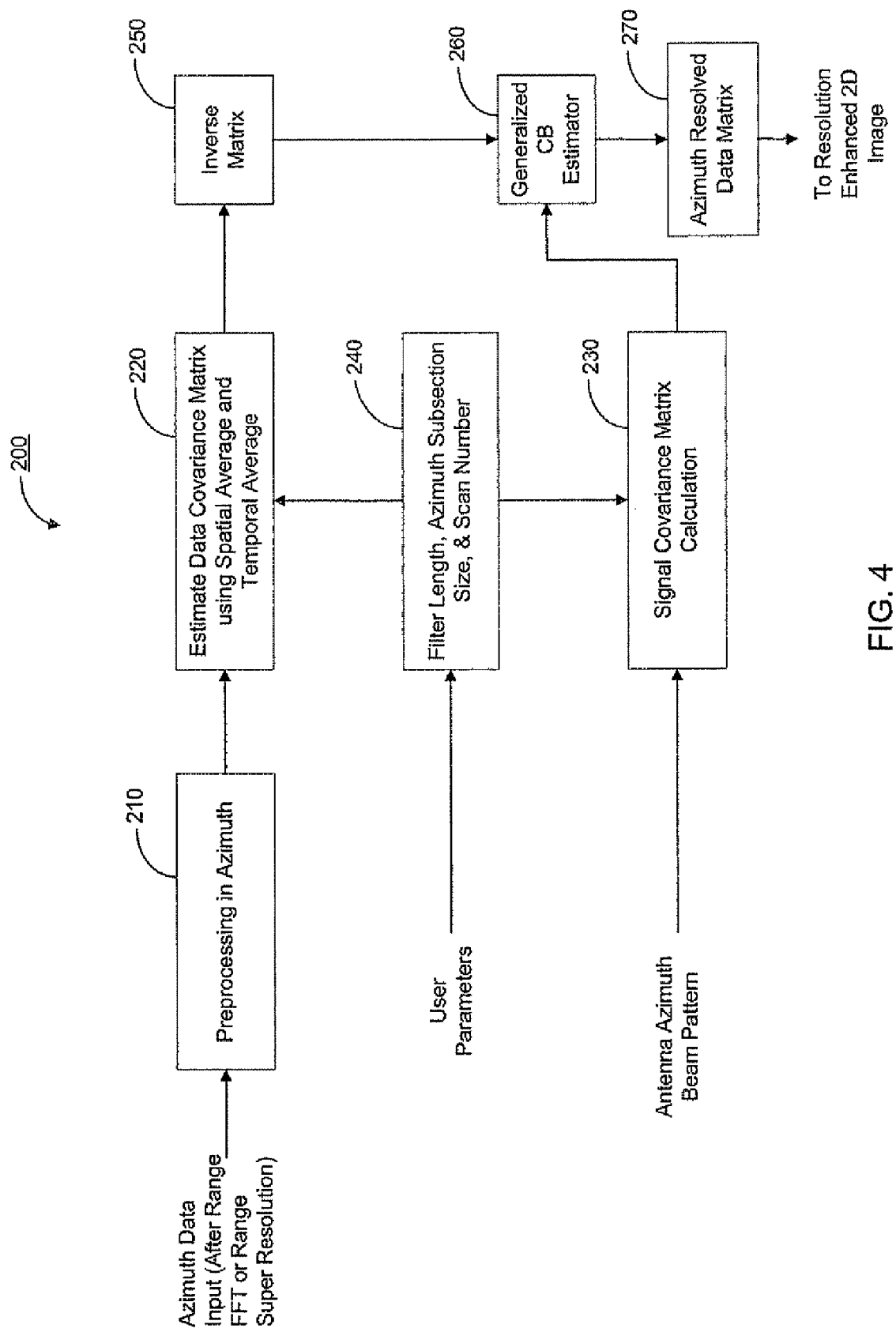
FIG. 4 depicts a block diagram of azimuth resolution enhancement employing a generalized Capon beamformer, according to one embodiment of the present invention.

Referring now to FIGS. 2 through 4, a more detailed description of the accurate target location estimation in azimuth 200 is now provided. More specifically, FIGS. 2 and 3 will provide similar descriptions of the generalized Capon beamforming (GCP) approach which generates accurate target location estimation in azimuth 200 of one or more potential targets 142 and selected potential target 154. As will become more apparent below, the GCB approach estimates a plurality of central angles and angular spreads of one or more hypothetical point sources, where the central angles and angular spreads are derived from a azimuth sampling of a plurality of antenna beam pattern scans output from a real beam radar to determine which among said one or more hypothetical sources is of interest while rejecting all other hypothetical point sources. Moreover, FIG. 4 is provided to provide a more detailed description of the actual filter design, which implements the GCB.

Before going on to providing a description of the azimuth resolution enhancement 188, which provides an accurate target location estimation in azimuth 200 it is helpful to appreciate the distinction between range and azimuth enhancement in real beam radar systems. Unlike the target response in range that is sinusoidal as discussed above, the target response in azimuth is guided by the antenna azimuth beam pattern (ABP) for RBR. Another distinction between range and azimuth is that the range signal is evenly sampled while the azimuth signal is not if the antenna azimuth scan is not linear (e.g., a sinusoidal scan). By considering the antenna ABP as the target azimuth response function and the unevenly sampling property in azimuth dimension, a generalized version of the CB (referred to as GCB) estimator is employed for azimuth enhancement.

Now referring back to FIG. 2, after the accurate target location estimation 184 and accurate target amplitude estimation 186 are processed, the output from accurate target amplitude estimation is available for correlation with the antenna azimuth beam pattern data and user parameters to allow azimuth enhancement 188 to the accurate target location estimation in azimuth 200 employing the GCB approach according to the present invention. Similar, FIG. 4, depicts a block diagram of the enhanced two-dimensional (2D) range and azimuth resolution architecture employing azimuth only resolution enhancement 40, according to one embodiment of the present invention. The difference between FIGS. 2 and 3 relates to the selection made by a user (e.g. pilot) of a region of interest displayed on a cockpit display of HUD where a determination is made whether the range rendered in the selected region of interest is acceptable or not. As discussed in FIG. 1, the user has the option of applying range and azimuth or azimuth only resolution enhancement 170 based upon his or her opinion. In another embodiment, the present invention provides an automated algorithm which can determine the adequacy of the rendered selected region of interest image in range based upon established metrics (e.g. clarity, intensity, brightness and the like) as known to those skilled in the art. Referring back to the difference between FIGS. 2 and 3, FIG. 2 depicts a case where a user or automated algorithm determined that the rendered range in the selected region of interest is not acceptable and FIG. 4 is the alternative determination where a user or automatic algorithm finds the selected region of interest in range is acceptable.

As discussed above, with reference to FIG. 2, if range enhancement 172 is requested, and range enhancement 182 is applied to both one or more potential target locations 142 and selected targets and amplitudes 154 after an inverse fast Fourier transform (IFFT) is applied to transform the range RBR signals from time domain to frequency domain data as well known in the art to reproduce the phase history 176 of the radar scan. Accordingly, the process of applying a IFFT to reproduce the phase history 176 is exclusive to the range enhancement of the present invention as shown in FIG. 2, and is not employed in FIG. 3 if a user or automatic algorithm finds the selected region of interest in range is acceptable, wherein azimuth only resolution enhancement 174 is applied to azimuth enhancement 188. Similarly, in FIG. 3 the output of block 174 which represents the acceptable range rendered in the selected region of interest is applied to resolution enhanced 2D image 190, while the other output from block 174 which represents the azimuth only resolution rendered in the selected region of interest is applied to accurate target location estimation 200.

With the distinction between FIGS. 2 and 3 in mind, the operation of the accurate target location estimation in azimuth 200 of one or more potential targets 142 and selected potential target 154 will be described with reference to both figures. FIG. 4 below will describe the actual filter implementation of the GCB to obtain accurate target location estimation in azimuth 200. As shown in both FIGS. 2 and 3, generated accurate target location estimation 184 and accurate amplitude estimation in range 186 (obtained by conventional linear least square (LLS) approach) is available for correlating with azimuth sampling information and other inputs by generalized CB (GCB) approach which determines the accurate target location estimation in azimuth 200, as discussed in more detail below. After accurate target location estimation in azimuth 200 of one or more potential targets 142 and selected potential target 154 is generated, an accurate target amplitude estimation in range 300 is obtained by conventional linear least square (LLS) approach. The enhanced accurate target location 200 and amplitude estimations in azimuth 300 of the one or more potential targets 142 and selected potential targets 154 is output to allow for rendering a resolved enhanced 2D image 190.

Now referring to FIG. 4, azimuth data, in the form of range enhancement data 182 shown in FIG. 2 or azimuth only data from block 174 shown FIG. 3 is preprocessed in azimuth 210. The preprocessed azimuth data is used to estimate a data covariance matrix using a spatial average and a temporal average 220. An inverse function is applied to the data covariance matrix 250. Contemporaneously to estimating the covariance matrix 220, a signal covariance matrix 230 is calculated from the radar's antenna azimuth beam pattern. Both the data covariance matrix 220 and signal covariance matrix 230 are controlled by user parameters (e.g. filter length, azimuth subsection size and scan number) 240. Thereafter the inverse matrix 250 of the estimated data covariance matrix 220 and the calculated signal covariance matrix 230 are adaptively beamformed by applying a generalized standard Capon beamformer filter 260 which is outputted to an azimuth resolved data matrix 270. Finally, the output from the azimuth resolved data matrix 270, along with the non-selected target information 160 shown in FIGS. 2 though 3, is combined with the enhanced range resolution 182 shown in FIG. 2 or the non-enhanced acceptable range resolution outputted from block 174 shown in FIG. 3, to render a resolution enhanced 2D image 190, which is processed and displayed, for example, a computer screen, LCD, HUD or the like.

The actual filter implementation of the generalized Capon beamformer approach shall now be described with reference to FIG. 4. As can be seen in FIG. 4, the antenna azimuth beam pattern is input where $a(\theta)$ denotes the antenna ABP and $\theta_s$ and $\theta_n$ denotes the azimuth angel location of a target scatterer s and the azimuth angle where the azimuth sample is taken, respectively. Accordingly, $a_m(\theta_n-\theta_s)$ represents the target response at azimuth sample angle $\theta_s$ from the scatterer s. Also, $x_k(n)$ corresponds to the data sample value obtained from the n-th azimuth angle position within the m-th azimuth scan (an azimuth scan is usually referred to as a B-scan that consists of a complete azimuth sampling from left to right or from right to left and generates a fill frame of image), which result in $$x_m(n)=a_m(\theta_n-\theta_s)\alpha_s+e_k(n), n=0,\ldots,N-1, m=0,\ldots,M-1 \quad \text{(Equation No. 11)},$$

where N and M are the total number of azimuth samples within a B-scan (or within a section of interest) and total number of scans, respectively, and $\alpha_s$ is the amplitude of the target scatterer s (including target RCS, system, and propagation factors). Similar to Equation No. 3 a sub-vector of length M is defined as, $$x_m(l)=[x_m(l)\ldots x_m(l+K-1)]^T, l=0,\ldots,L=N-K+1 \quad \text{(Equation No. 12)}$$

The CB filter in Equation No. 11, above is referred to as forward only estimates of the filter and the amplitude (later determined by linear least square approach). This is because they were obtained by using the data covariance matrix R which is estimated from forward vectors x(l). It has been shown that averaging forward and backward covariance matrices gives improved amplitude estimates. Therefore, in the present inventions implementations of the spectral estimators, forward-backward covariance matrix is employed as one possible embodiment.

After the preprocessing in azimuth 210 just described, a new data sample covariance matrix 220 is defined as the following, which takes into account both spatial sample (in azimuth) and temporal processing (continuous scanning)

$$\hat{R}_1 = \frac{1}{LM}\sum_{m=0}^{M-1}\sum_{l=0}^{L-1} x_m(l)x_m^H(l) \quad \text{(Equation No. 13)}$$

At the same time a signal covariance matrix 230 is defined for the m-th scan $$\hat{R}_{sm} = \frac{1}{L}\sum_{l=0}^{L-1} a_m(l)a_m^H(l) \quad \text{(Equation No. 14)}$$

where $a_m(l)$ is a vector formed from the sequence $a_m(\theta_n-\theta_s)$ in the same way as $x_m(l)$ is formed from $x_m(n)$.

Note that for the stepped (linearly or nonlinearly) scan, the azimuth scan can be controlled so that the azimuth sampling is taken at the same angle locations for each scan. Other user parameters (e.g. filter length, azimuth subsection size and scan number) 240 can be input to control both the data covariance matrix estimation 220 and the signal covariance matrix calculation 230. In this case, $a_m(\theta_n-\theta_s)$, $a_m(l)$, and $\hat{R}_{sm}$ are independent of the scan index m. For a sinusoidal scan in azimuth, azimuth samples are taken at different sets of azimuth angle positions for different scans. In this case, a preprocessing step 210 is employed to obtain the azimuth sample values at the azimuth angle locations as the m-th (say, e.g, the first one) scan. If this step is not used, then the signal covariance matrix 230 is estimated as an average of the M $\hat{R}_{sm}$ matrices.

Then a GCB filter 260 is designed to maximize the following signal-to-noise ratio (SNR)

$$\max_h \frac{h_1^H \hat{R}_{sm} h_1}{h_1^H \hat{R}_n h_1} \quad \text{(Equation No. 15)}$$

where $\hat{R}_n$ denotes that noise covariance matrix. Taking a general assumption that the signal and noise are uncorrelated, we have $\hat{R}_1 = \hat{R}_{sm} + \hat{R}_n$. The maximization problem in (15) is equivalent to $$\max_h \frac{h_1^H \hat{R}_{sm} h_1}{h_1^H \hat{R}_1 h_1} \quad \text{(Equation No. 16)}$$

The solution to the above maximization problem is readily given by $$\hat{h}_1 = p_{max}(\hat{R}_1^{-1} \hat{R}_{sm}) \quad \text{(Equation No. 17)}$$

where $p_{max}(\bullet)$ denotes that the principal eigenvector corresponding to the largest eigenvalue of a matrix. The power received from the target scatterer is estimated as $$P_1 = \frac{1}{LM}\sum_{m=0}^{M-1}\sum_{l=0}^{L-1}\left|\hat{h}_1^H x_m(l)\right|^2 = \hat{h}_1^H \hat{R}_1 \hat{h}_1 \quad \text{(Equation No. 18)}$$

and the signal amplitude can be readily estimated using a least square (LS) approach from the filtered sequence $\hat{h}_1^H x_m(l)$, $l=0,\ldots,L-1; m=0,\ldots M-1$ which is shown in FIGS. 2 and 3 generating an accurate target amplitude in azimuth 300.

The resulting eigenvector and eigenvalue are resolved into azimuth data matrix 270; Referring back to FIGS. 2 and 3, the enhanced range resolution 182 shown in FIG. 2 or the acceptable noon-enhanced range resolution outputted from block 174 shown in FIG. 3 along with the non-selected target information 160 is combined with the enhanced azimuth resolution 188 from data matrix 270 shown in FIG. 4 to render a resolution enhanced 2D image 190, which is processed in, for example, a computer screen, LCD, HUD or the like.

Accordingly, the present invention as described above provides a novel architecture for 2D super resolution enhancement applications by providing dual-mode region selection to define region of interest for processing, and a combined approach for target location and amplitude estimation, CFAR or GMTI based automatic target detection approach for automatic selection of region of interest, Generalized CB approach 260 that uses both spatial and temporal information for data sample covariance estimation, and azimuth interpolation scheme for unevenly sampled azimuth data.

Hence, the present inventions signal processing technique enhances both range and azimuth resolution for RBR employed by AALG systems without requiring modification of the radar front-end hardware to improve the image quality. That is the present invention enhances both range and azimuth resolution of RBR while suppressing clutter background so that both visual and automatic feature extraction (e.g., runway edge, road, shadow, etc) and target detection (e.g., vehicle, building, etc) capabilities can be improved for situational awareness (SA) applications such as AALG systems.

As will be readily apparent to those skilled in the art, the present invention or aspects of the invention can be realized in hardware, or as some combination of hardware and software. Any kind of computer/server system(s)—or other apparatus adapted for carrying out the methods described herein—is suited. A typical combination of hardware and software could be a general-purpose computer system with a computer program that, when loaded and executed, carries out methods described herein. Alternatively, a specific use computer, containing specialized hardware for carrying out one or more of the functional tasks of tie invention, could be utilized.

The present invention or aspects of the invention can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

What is claimed is:

1. A method of enhancing range and azimuth resolution in a two-dimensional (2D) image generated by a frequency modulated continuous-wave (FMCW) radar for providing enhanced situational awareness in autonomous approach and landing guidance (AALG) system, comprising the steps of
forming and displaying a two-dimensional (2D) model of landing conditions from received range and azimuth real beam radar (RBR) signals by rendering one or more target locations and amplitudes in both range and azimuth;
selecting a region of interest from said displayed 2D model to enhance said one or more target locations and amplitudes in said selected region of interest;
applying both range and azimuth resolution enhancement to enhanced the rendered one or more target locations and amplitudes in both range and azimuth; and
combining the enhanced one or more target locations and amplitudes in range and azimuth to render an enhanced 2D image.

2. The method of claim 1, wherein said range resolution is enhanced by generating one or more accurate target location estimations of said rendered one or more target locations in range by applying a first beamforming approach and said azimuth resolution enhancement is enhanced by generating one or more accurate target location estimations in azimuth by applying a second beamforming approach.

3. The method of claim 2, wherein said first beamforming approach adaptively applies a standard Capon beamforming approach comprising the steps of:
reproducing the original range and azimuth RBR signals in said selected region of interest; and
beamforming said original range RBR signal to render one or more accurate target locations in range by passing a frequency f of interest undistorted while attenuating all other frequencies.

4. The method of claim 3, wherein the one or more accurate target amplitude estimations of said rendered one or more target amplitudes in range and azimuth, are generated by a linear least square approach.

5. The method of claim 3, wherein said standard Capon beamforming (CB) approach solves the following optimization problem, $$\min_{h} h^H \hat{R} h, \text{ subject to } h^H a(f) = 1,$$

where $$a(f) = [1 \ \ldots \ e^{j2\pi f(K-1)}]^T, f \in [0, 1)$$

is a steering vector, wherein said CB approach comprises the steps of:
determining a spectral weight vector $$\hat{h}_{CB}(f) = \frac{R^{-1}a(f)}{a^H(f)R^{-1}a(f)};$$

and
calculating the output of the CB approach by substituting said determined spectral weight vector into said FIR output power to estimate of the filter output power at frequency f $$\hat{P}(f) = \frac{1}{a^H(f)R^{-1}a(f)}$$

wherein said CB approach passes said frequency of interest undistorted while attenuating all other frequencies.

6. The method of claim 2, wherein said second beamforming approach adaptively applies a generalized Capon beamforming approach on said original azimuth RBR signal to render one or more second accurate target locations in azimuth by estimating a plurality of central angles and angular spreads of one or more hypothetical sources, said central angles and angular spreads derived from a azimuth sampling of a plurality of antenna beam pattern scans output from said real beam radar to determine which among said one or more hypothetical sources is of interest while rejecting all other hypothetical sources.

7. The method of claim 6, wherein said azimuth sampling of a plurality of antenna beam pattern scans output from said real beam radar can be obtained by a linear stepped scan, a non-linear stepped scan or a sinusoidal scan, said linear and non-linear stepped scans are configured so that an azimuth sampling is taken at the same angle locations in each scan and said sinusoidal scan configured so that azimuth samples are taken at even and odd azimuth angle positions for different scans.

8. The method of claim 7, wherein said generalized Capon beamforming approach further includes the steps of:
estimating a data covariance matrix by employing a spatial average and temporal average on said received azimuth samples, a target location in range data, and inputted user parameters;
calculating a signal covariance matrix from said plurality of antenna beam pattern scans output and said inputted user parameters;
generating an inverse matrix from said estimated data covariance matrix; and
estimating by adaptively applying a generalized Capon beamformer on combined said generated inverse matrix and said calculated signal covariance matrix, and
outputting an azimuth resolved data matrix,
wherein, if said azimuth sampling is obtained by sinusoidal scan said azimuth sampling is preprocessed by an interpolation approach to obtain a plurality of azimuth sample values at the same set of azimuth angle location as the first scan.

9. The method of claim 8, wherein said step of estimating a data covariance matrix further includes:
defining a data sample covariance matrix, $$\hat{R}_1 = \frac{1}{LM} \sum_{m=0}^{M-1} \sum_{l=0}^{L-1} x_m(l) x_m^H(l)$$

where $x_m(n) = a_m(\theta_{n-\theta_s})\alpha_s + e_k(n)$, $n = 0, \ldots, N-1$, $m = 0, \ldots, M-1$ such that $\theta_s$, $and \ \theta_n$ denote an azimuth angel location of a target scatterer s and an azimuth angle where an azimuth sample is taken, respectively, $a_m(\theta_n - \theta_s)$ represents a target response at azimuth sample angle $\theta_s$, from the scatterer s, $x_k(n)$ corresponding to a data sample value obtained from the n-th azimuth angle position within an m-th azimuth scan and where N and M are a total number of azimuth samples within a section of interest and total number of scans, respectively, and $\alpha_s$ is an amplitude of the target scatterer s and a sub-vector of length M, $$x_m(l) = [x_m(l) \ldots x_m(l+K-1)]^T, l=0, \ldots, L-1; L=N-K+1.$$

10. The method of claim 8, wherein said step of calculating said signal covariance matrix further including the sub-steps of:

defining for an m-th scan $$\hat{R}_{sm} = \frac{1}{L}\sum_{l=0}^{L-1} a_m(l)a_m^H(l)$$

where $a_m(l)$ is a vector formed from the sequence $a_{m(\Theta n}-\theta_s)$ in the same way as $x_m(l)$ is formed from $x_m(n)$.

11. The method of claim 8, further including adaptively applying a generalized Capon Beamformer approach includes:

maximizing a signal-to-noise ratio (SNR)

$$\max_{h} \frac{h_1^H \hat{R}_{sm} h_1}{h_1^H \hat{R}_n b_1}$$

where $\hat{R}_n$ denotes a noise covariance matrix, $\hat{h}_1 = p_{max}(\hat{R}_1^{-1} R_{sm})$, and $p_{max}()$ denotes a principal eigenvector corresponding to a largest eigenvalue of a matrix;

calculating a power received from the target scatterer by estimation $$P_1 = \frac{1}{LM}\sum_{m=0}^{M-1}\sum_{l=0}^{L-1}\left|\hat{h}_1^H x_m(l)\right|^2 = \hat{h}_1^H \hat{R}_1 \hat{h}_1.$$

12. The method of claim 8, wherein said input user parameters are a filter length, azimuth subsection size and scan number.

13. The method of claim 7, wherein, said target location in range data is the generated one or more accurate target location estimations in range.

14. The method of claim 2, wherein said step of selecting a region of interest further includes the step of selecting by one of an automatic and a manual selection approach.

15. The method of claim 14, wherein said automatic selection approach employs a constant false alarm rate (CFAR) detection-processing algorithm.

16. The method of claim 14, wherein said manual selection approach permits a user to select the region of interest of the potential target from an image display.

17. A computer readable program storage device, tangibly embodying a program of instructions executable by the computer to perform a method of enhancing resolution in a two-dimensional (2D) image generated by a frequency modulated continuous-wave (FMCW) radar for providing enhanced situational awareness in autonomous approach and landing guidance (AALG) system, comprising the steps of forming and displaying a two-dimensional (2D) model of landing conditions from received range and azimuth real beam radar (RBR) signals by rendering one or more target locations and amplitudes in both range and azimuth;

selecting a region of interest from said displayed 2D model to enhance said one or more target locations and amplitudes in said selected region of interest;

selectively applying both range and azimuth resolution enhancement as a first option to enhance the rendered one or more target locations and amplitudes in both range and azimuth or applying azimuth resolution enhancement only as a second option to enhance the rendered one or more target locations and amplitudes in azimuth only; and combining the enhanced one or more target locations and amplitudes to render an enhanced 2D image, wherein said first option applies said range resolution enhancement by generating one or more accurate target location estimations of said rendered one or more target locations in range by applying a first beamforming approach and applies said azimuth resolution enhancement by generating one or more second accurate target location estimations in azimuth by applying a second beamforming approach, and said second option accepts the rendered one or more target locations in range and applies said azimuth resolution enhancement by generating one or more accurate target location estimation in azimuth by applying said second beamforming approach.

18. A method of enhancing resolution in a two-dimensional (2D) image generated by a frequency modulated continuous-wave (FMCW) radar for providing enhanced situational awareness in autonomous approach and landing guidance (AALG) system, comprising the steps of:

forming and displaying a two-dimensional (2D) model of landing conditions from received range and azimuth real beam radar (RBR) signals by rendering one or more target locations and amplitudes in both range and azimuth;

selecting a region of interest from said displayed 2D model to enhance said one or more target locations and amplitudes in said selected region of interest;

applying azimuth resolution enhancement to enhance the rendered one or more target locations and amplitudes in azimuth; and combining the one or more target locations and amplitudes in range and azimuth to render an enhanced 2D image, wherein said azimuth resolution enhancement is enhanced by generating one or more accurate target location estimations in azimuth by applying a beamforming approach to said target location estimations in azimuth.

* * * * *